(12) United States Patent
Endel et al.

(10) Patent No.: US 10,794,604 B2
(45) Date of Patent: Oct. 6, 2020

(54) BUILDING COMFORT CONTROL DEVICES, METHODS, AND SYSTEMS

(71) Applicant: Honeywell International Inc., Morris Plains, NJ (US)

(72) Inventors: Petr Endel, Prague (CZ); Ondrej Holub, Prague (CZ); Karel Marik, Revnice (CZ)

(73) Assignee: Honeywell International Inc., Morris Plains, NJ (US)

( * ) Notice: Subject to any disclaimer, the term of this patent is extended or adjusted under 35 U.S.C. 154(b) by 111 days.

(21) Appl. No.: 15/406,581

(22) Filed: Jan. 13, 2017

(65) Prior Publication Data
US 2018/0202677 A1 Jul. 19, 2018

(51) Int. Cl.
| | |
|---|---|
| *F24F 11/30* | (2018.01) |
| *G05B 19/042* | (2006.01) |
| *F24F 11/64* | (2018.01) |
| *F24F 11/65* | (2018.01) |
| *F24F 120/20* | (2018.01) |

(52) U.S. Cl.
CPC ............ *F24F 11/30* (2018.01); *F24F 11/64* (2018.01); *F24F 11/65* (2018.01); *G05B 19/042* (2013.01); *F24F 2120/20* (2018.01); *G05B 2219/2614* (2013.01)

(58) Field of Classification Search
CPC .. F24F 11/62; F24F 11/30; F24F 11/63; F24F 2120/20; F24F 2120/12; F24F 2120/10; F24F 2120/14
See application file for complete search history.

(56) References Cited

U.S. PATENT DOCUMENTS

| | | | |
|---|---|---|---|
| 9,696,056 B1* | 7/2017 | Rosenberg | F24F 11/30 |
| 2013/0226320 A1* | 8/2013 | Berg-Sonne | G05B 15/02 700/90 |
| 2014/0222215 A1* | 8/2014 | Nishiyama | H05B 37/0272 700/275 |
| 2014/0358291 A1* | 12/2014 | Wells | G05D 23/1902 700/276 |
| 2015/0081107 A1* | 3/2015 | Graham | G05B 19/048 700/276 |

(Continued)

OTHER PUBLICATIONS

F. Auffenberg, S. Stein, A. Rogers "A personalised thermal comfort model using a Bayesian Network", Proceedings of the Twenty-fourth International Joint Conference on Artificial Intelligence (IJCAI 2015) (2015), pp. 2547-2553 (Year: 2015).*

(Continued)

*Primary Examiner* — Robert E Fennema
*Assistant Examiner* — Shon G Foley
(74) *Attorney, Agent, or Firm* — Seager Tufte & Wickhem LLP

(57) ABSTRACT

Devices, methods, and systems for building comfort control are described herein. One system includes computing device for building comfort control, comprising: a memory, and a processor configured to execute instructions to: receive feedback from a plurality of users on a comfort level for an area of a building, generate a comfort model for each of the plurality of users based on the feedback, and adjust a number of settings of a heating, ventilation, and air conditioning (HVAC) unit for the area based on the comfort model for users among the plurality of users who are currently in the area.

19 Claims, 5 Drawing Sheets

(56) References Cited

U.S. PATENT DOCUMENTS

2016/0131383 A1* 5/2016 Zhao ................ F24F 11/006
          700/276

OTHER PUBLICATIONS

Purdon, et al., "Model-Free HVAC Control Using Occupant Feedback", Second IEEE International Workshop on Global Trends in Smart Cities 2013, Oct. 21, 2013, 9 pp.

Gupta, et al., "Smart Temperature Control With Active Building Occupant Feedback", http://citeseerx.ist.psu.edu/viewdoc/download?doi=10.1.1.705.7165&rep=rep1&type=pdf, 9 pp.

* cited by examiner

BUILDING COMFORT CONTROL DEVICES, METHODS, AND SYSTEMS

CROSS REFERENCE TO RELATED APPLICATION

This application is related to U.S. application Ser. No. 14/926,881, filed Oct. 29, 2015, which is incorporated herein by reference in its entirety.

TECHNICAL FIELD

The present disclosure relates to devices, methods, and systems for building comfort control.

BACKGROUND

Buildings that are utilized by a plurality of people can include heating, ventilation, and air conditioning (HVAC) units to control the building's internal environment. In some examples, the HVAC units can utilize a plurality of sensors to determine current environmental conditions for different areas within the building. In some examples, the plurality of people can utilize the thermostats to change input settings of the HVAC units.

In some cases the plurality of people can have different comfort levels and/or tolerance levels for temperature and other features of a surrounding environment. For example, a first person may be comfortable at a first temperature range and a second person may be comfortable at a second temperature range. In this example, the first person may attempt to change a thermostat to a setting within the first temperature range and the second person may attempt to change the thermostat to a setting within the second temperature range.

The changes to the thermostat from the plurality of users can result in conflicts between the plurality of people, increased temperature fluctuation, and/or an under/over-utilization of HVAC resources. These conflicts and/or temperature fluctuations can result in less productivity from the plurality of people.

DETAILED DESCRIPTION

Figure 1:
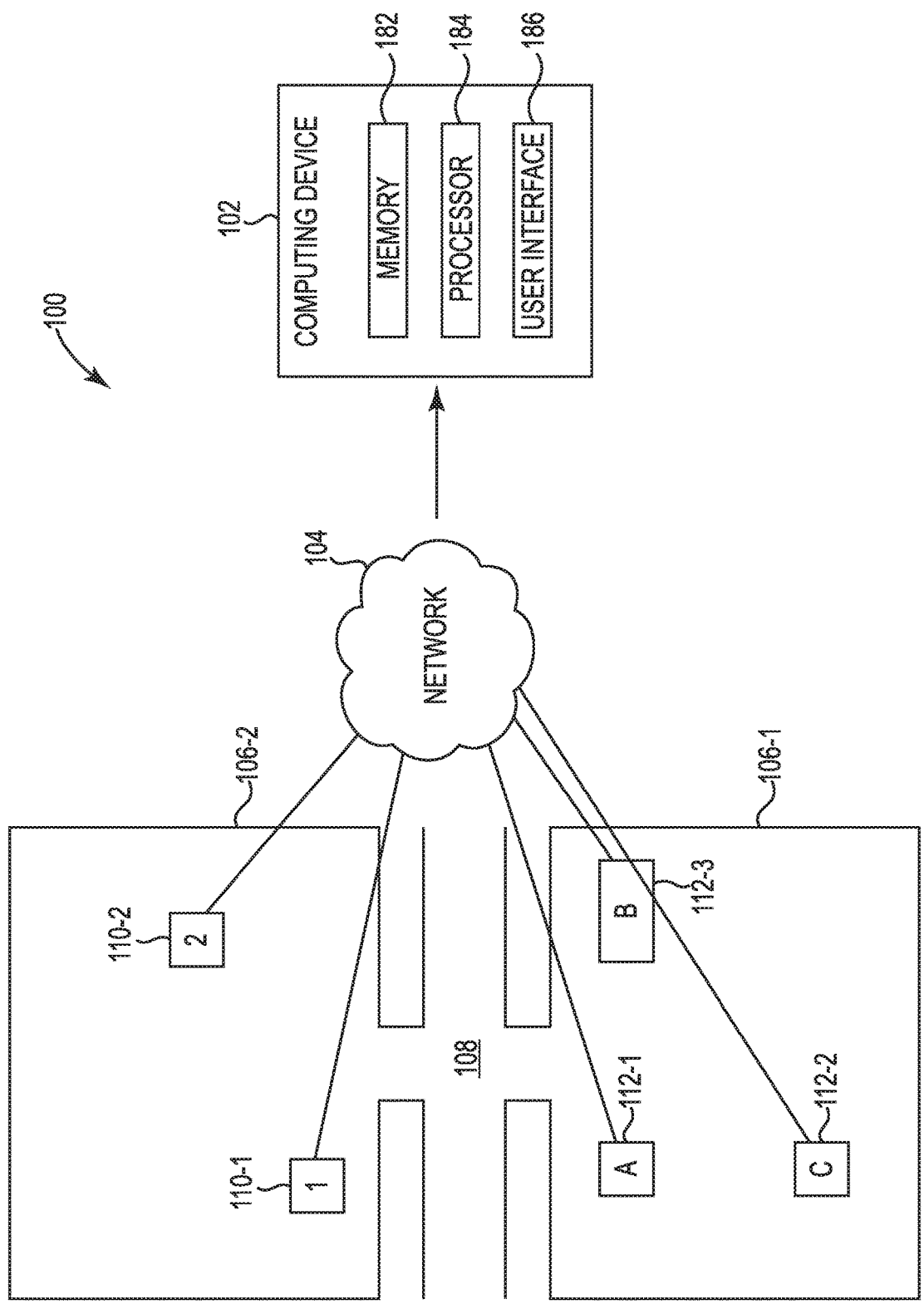
FIG. 1 is an example of a system for building comfort control according to one or more embodiments of the present disclosure.

Building comfort control devices, methods, and systems are described herein. For example, one or more embodiments include a system that includes a computing device for building comfort control, comprising: a memory, and a processor configured to execute instructions to: receive feedback from a plurality of users on a comfort level for an area of a building, generate a comfort model for each of the plurality of users based on the feedback, and adjust a number of settings of a heating, ventilation, and air conditioning (HVAC) unit for the area based on the comfort model for users among the plurality of users who are currently in the area.

The building comfort control devices, methods, and systems described herein can be utilized to collect feedback from a plurality of users and/or a plurality of people within an area of a building. For example, the plurality of users currently within the area of the building can utilize a mobile application to provide feedback of their comfort level. In this example, the feedback can be received with a corresponding user ID. The feedback can be utilized to generate a comfort model for each of the plurality of users utilizing the corresponding user ID of the feedback. The comfort model for each of the plurality of users can be utilized to adjust settings of an HVAC unit of the building so that the users of the building have a minimal possible level of discomfort, the human performance degradation due to discomfort is minimized, identify anomalies with the HVAC unit, and/or identify anomalies associated with the area of the building.

The building comfort control devices, methods, and systems described herein can be utilized to generate a comfort model and a corresponding discomfort function for each of the plurality of users based on the feedback. In some examples, the discomfort function can be utilized to identify more environmentally sensitive users among the plurality of users. In addition, the discomfort function can be combined with a productivity model to generate a human performance degradation function for each of the plurality of users. In some examples, the human performance degradation function can identify a degradation of performance of the user for corresponding environment conditions (e.g., temperature, etc.). The comfort model, discomfort function, and/or degradation function can be utilized to adjust environmental settings (e.g., temperature settings, airflow settings, heating, ventilation, and air conditioning (HVAC) unit settings, and lighting settings for areas within the building, etc.) to reduce performance degradation due to discomfort and/or increase productivity of the users currently within the area of the building.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of users" can refer to one or more users. Additionally, the designator "N", as used herein, particularly with respect to reference numerals in the drawings, indicates that a number of the particular feature so designated can be included with a number of embodiments of the present disclosure.

FIG. 1 is an example of a system 100 for building comfort control according to one or more embodiments of the present disclosure. In some examples, the system 100 can be utilized to collect comfort feedback from a plurality of users (e.g., users 110-1, 110-2, users 112-1, 112-2, 112-3, plurality of users currently within the area of the building, etc.) within a plurality of different areas 106-1, 106-2 of a building. In some examples, each of the plurality of users can utilize a network 104 to provide comfort feedback to a computing device 102. In some examples, the computing device 102 can be utilized to receive and process the feedback as described herein.

In some examples, the system 100 can include a portion of a building. For example, the system 100 can include a first area 106-1 and a second area 106-2 within a building. In this example, the first area 106-1 can be a first room and the second area 106-2 can be a second room that is separated from the first room by a hallway 108. In some examples, the first area 106-1 can include a number of users 112-1, 112-2, 112-3 (e.g., occupants). In these examples, the number of users 112-1, 112-2, 112-3 in the first area 106-1 can provide comfort feedback to the computing device 102 for the first area 106-1.

In some examples, the number of users 112-1, 112-2, 112-3 can each utilize a computing device (not shown) that can receive input comfort levels of the corresponding user and transmit the received comfort levels to the computing device 102 via the network 104. In some examples, the number of users 112-1, 112-2, 112-3 can provide feedback of their comfort level at a time when the number of users 112-1, 112-2, 112-3 are within the first area 106-1.

In some examples, the computing device 102 can receive the feedback as messages that include a description of the comfort level of a user, a time that the user was within the first area 106-1, and/or environmental data (e.g., environmental variables) of the first area 106-1 at the time the user provided the feedback or when the user was within the first area 106-1, and/or external data (e.g. outside air temperature, outside air humidity) at the time the user provided the feedback or when the user was within the first area 106-1. The messages can include a value from a comfort level scale that represents a comfort level of a user within the area. For example, the user 112-1 can complete a survey and/or provide a value corresponding to their comfort level while in the first area 106-1. In this example, a message corresponding to the survey and/or value corresponding to their comfort level can be sent to the computing device 102 via the network 104. The message can include a timestamp, a location, and/or the value corresponding to the comfort level of the user 112-1.

In some examples, the feedback from the plurality of users can be utilized by the computing device 102 to generate comfort models, discomfort functions, and/or human performance degradation functions for each of the plurality of users. In some examples, the computing device 102 can be coupled to a HVAC unit for the building that provides cooling and heating resources to the first area 106-1 and the second area 106-2. For example, the computing device 102 can utilize the feedback and/or generated comfort model to adjust (e.g., alter, change, etc.) settings of the HVAC unit for each of the areas 106-1, 106-2 based on the comfort model, discomfort function, and/or human performance degradation function of users currently within the first area 106-1 and/or the second area 106-2.

In some examples, the computing device 102 can be utilized to identify the users 112-1, 112-2, 112-3 within the first area 106-1 and/or the users 110-1, 110-2 within the second area 106-2. In some examples, the computing device 102 can determine the identity of the users within each of the areas 106-1, 106-2 and adjust environmental settings of each of the areas 106-1, 106-2 based on the comfort models of the users within each of the areas 106-1, 106-2. In some examples, the computing device 102 can determine an identity of the plurality of users within the area at a particular time. For example, the computing device 102 can determine that user 110-1 and user 110-2 are within area 106-2. In this example, the computing device can utilize the comfort model of user 110-1 and user 110-2 to adjust HVAC settings corresponding to the area 106-2.

In some examples, the computing device 102 can adjust the HVAC settings of an area based on comfort models of users within the area by determining users comfort conditions and sensitivity level for the users. For example, the computing device 102 can determine which (if any) of the users within the area has a relatively higher sensitivity level as compared to the sensitivity levels of other users. In some examples, the computing device can rate the plurality of users based on the comfort model for each of the plurality of users. In some examples, the rating can be based on the comfort conditions and/or sensitivity level of the users.

As used herein, a comfort conditions correspond to an environmental setting value where a user is "comfortable" or has provided feedback indicating that the user is currently comfortable. Sensitivity level corresponds to rate of change of user's comfort feedback based on change of environmental variables. A user with a relatively higher sensitivity level can be comfortable at a relatively smaller range of environmental variable values (e.g., temperatures), making the user relatively more sensitive to environmental variable changes as compared to the other users. A user with a relatively lower sensitivity level can be comfortable at a relatively larger range of temperature values, making the user relatively less sensitive to environmental variable changes as compared to other users.

In some examples, the sensitivity level of the user can be utilized to weight the average environmental settings of the users within the area. In some examples, the computing device 102 can determine a weighted average of the comfort models of the plurality of users. As used herein, a weighted average can be an average of the comfort model values for the plurality of users within an area that also includes a weighted value based on a sensitivity level of the plurality of users within the area.

In some examples, the computing device 102 can utilize the average of the comfort models, for the users within the area with the weighted values of the users sensitivity level to determine an optimal temperature or mutual comfort condition for the area based on the users within the area. As additional users enter the area or as users within the area leave the area, the computing device 102 can determine if adjustments to the environmental settings based on the current users within the area may be needed. In this way, the computing device 102 can maintain environmental settings based on preferences of users within the area.

In some examples, the computing device 102 can utilize the comfort model, discomfort function, and/or human performance degradation function to generate a summation for each of the plurality of users currently within the area of the building. The summation can be an overall comfort, overall discomfort function, and/or overall performance degradation function for the area at a time when the plurality of users are currently within the area of the building. In some examples, the computing device 102 can determine a maximum value of overall function and/or a minimum value of overall function for the area. In some examples, the computing device 102 can utilize the maximum value of overall function and/or the minimum value of overall function to determine an optimal temperature or mutual comfort condition for the area based on the users within the area. As described herein, the computing device 102 can alter settings of an HVAC system based on the maximum value of overall function and/or the minimum value of overall function for the area.

The computing device 102 can be, for example, a laptop computer, a desktop computer, a microprocessing resource, or a mobile device (e.g., a mobile phone, a personal digital assistant, etc.), among other types of computing devices. Computing device 102 can be utilized to perform the method 560, generate graphical representations 220, 340, or 450 and/or to perform the functions described herein.

As shown in FIG. 1, computing device 102 includes a memory 182 and a processing resource 184 (e.g., processor) coupled to memory 182. Memory 182 can be any type of storage medium that can be accessed by processing resource 184 to perform various examples of the present disclosure. For example, memory 182 can be a non-transitory computer readable medium having computer readable instructions (e.g., computer program instructions) stored thereon that are executable by processing resource 184 to perform security log mining in accordance with one or more embodiments of the present disclosure.

Memory 182 can be volatile or nonvolatile memory. Memory 182 can also be removable (e.g., portable) memory, or non-removable (e.g., internal) memory. For example, memory 182 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disc read-only memory (CD-ROM)), flash memory, a laser disc, a digital versatile disc (DVD) or other optical disk storage, and/or a magnetic medium such as magnetic cassettes, tapes, or disks, among other types of memory.

Further, although memory 182 is illustrated as being located in computing device 102, embodiments of the present disclosure are not so limited. For example, memory 182 can also be located internal to another computing resource (e.g., enabling computer readable instructions to be downloaded over the Internet or another wired or wireless connection).

As shown in FIG. 1, computing device 102 can also include a user interface 186. User interface 186 can include, for example, a display (e.g., a screen). The display can be, for instance, a touch-screen (e.g., the display can include touch-screen capabilities). User interface 186 (e.g., the display of user interface 186) can provide (e.g., display and/or present) information to a user of computing device 102.

Additionally, computing device 102 can receive information from the user of computing device 102 through an interaction with the user via user interface 186. For example, computing device 102 (e.g., the display of user interface 186) can receive input from the user via user interface 186. The user can enter the input into computing device 102 using, for instance, a mouse and/or keyboard associated with computing device 102, or by touching the display of user interface 186 in embodiments in which the display includes touch-screen capabilities (e.g., embodiments in which the display is a touch screen).

Figure 2:
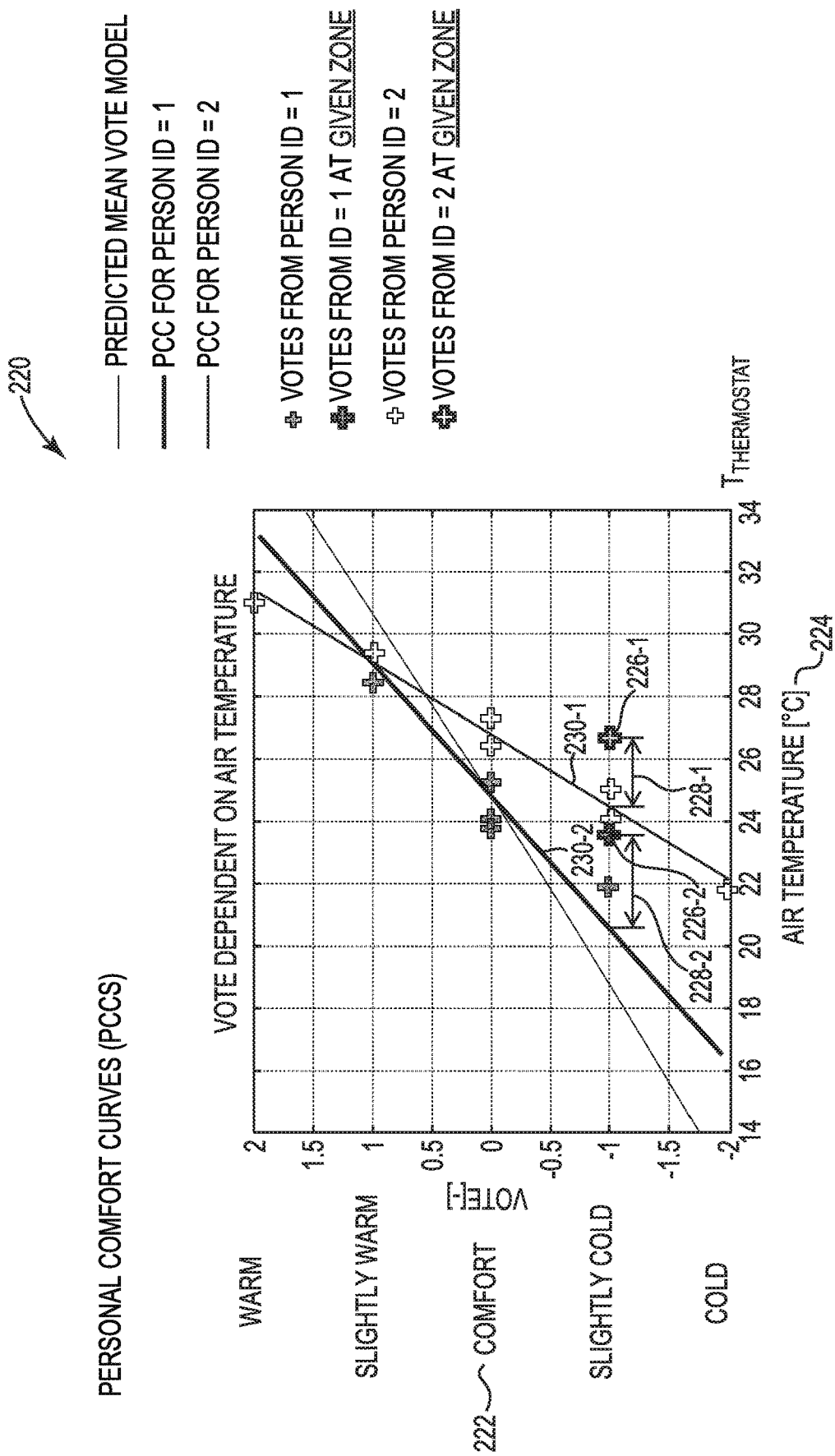
FIG. 2 is an example of a graphical representation of a number of comfort models generated according to one or more embodiments of the present disclosure.

FIG. 2 is an example of a graphical representation 220 of a number of comfort models generated according to one or more embodiments of the present disclosure. The graphical representation 220 can be generated by a computing device, such as computing device 102 as described herein. The graphical representation 220 can include an x-axis 224 that can represent air temperature or other environmental conditions. The graphical representation 220 can also include a y-axis 222 that can represent a comfort level, a vote, and/or feedback from a user. In some examples, the y-axis 222 can include a comfort level scale that represents a comfort level of a user within the area.

In some examples, the graphical representation 220 can be generated utilizing feedback and/or messages that includes comfort levels at a plurality of different temperatures or environmental conditions within an area. Graphical representation 220 illustrates a comfort model 230-1 for a first user with a first user ID and a comfort model 230-2 for a second user with a second user ID. As described herein, a comfort model can be generated for each of a plurality of different users.

In some examples, the feedback and/or messages received from the first user and the second user can be illustrated as votes. For example, a first user can provide feedback of "slightly cold" at an air temperature of 27 degrees Celsius. In this example, the graphical representation 220 can include vote 226-1 to represent that the first user provided feedback of "slightly cold" at an air temperature of 27 degrees Celsius. In another example, the graphical representation 220 can include vote 226-2 to represent that a second user provided feedback of "slightly cold" at an air temperature of 24 degrees Celsius. The votes for each of the users can be plotted on the graphical representation 220 to generate a first comfort model 230-1 can be fitted to the votes by e.g. least squares method for the first user and a second comfort model 230-2 for the second user.

In some examples, the graphical representation 220 can include a deviation 228-1 between a vote 226-1 and the comfort model 230-1, and a deviation 228-2 between vote 226-2 and the comfort model 230-2. In some examples, the deviations 228-1, 228-2 can be utilized to adjust the corresponding comfort models 230-1, 230-2.

In some examples, the deviations 228-1, 228-2 can be utilized to determine an anomaly associated with a particular area as described herein. In some examples, a computing device can determine an anomaly associated with the area based on received feedback from a user among the plurality of users being outside a threshold of the distance of the feedback of the user from the comfort model of the user. For instance, the computing device can determine an anomaly may exist within the area when the deviations 228-1, 228-2 are outside a threshold value. In some examples, the anomaly associated with the area can include, a thermostat failure within the area, wrongly placed sensor, a heating, ventilation, and air conditioning (HVAC) unit failure within the area, a lighting failure within the area, a paint color of the area, a design of the area, type of activity in the area, and/or other anomalies within the area.

The deviations 228-1, 228-2 can also be utilized to determine anomalies associated with a particular area, the HVAC unit providing resources to a particular area, and/or anomalies related to a temperature sensor for a particular area. In some examples, the anomalies that are associated with the particular area can include, but are not limited to: air circulation within the area, color of the walls, artwork within the room, level of natural sunlight, type of non-natural light, etc. In some examples, the computing device can determine that a deviation 228-1, 228-2 corresponds to an anomaly other than air temperature of the area. In these examples, the computing device can notify a user or administrator that deviations 228-1, 228-2 exist for users within an area and that an inspection of the area should be conducted. The inspection can identify specific anomalies within the area.

Figure 3:
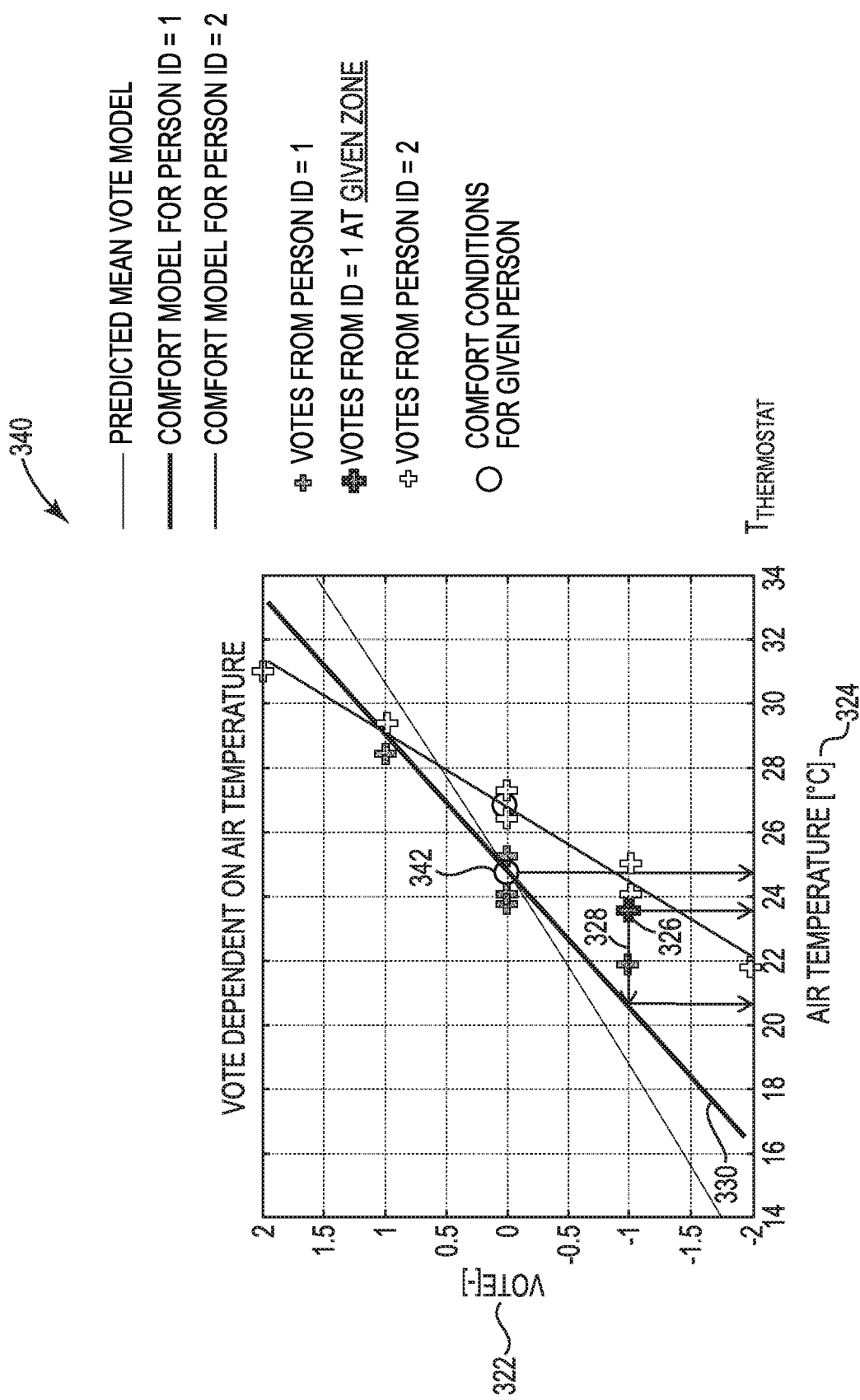
FIG. 3 is an example of a graphical representation that includes a comfort condition determined according to one or more embodiments of the present disclosure.

FIG. 3 is an example of a graphical representation 340 that includes a comfort condition determined according to one or more embodiments of the present disclosure. The graphical representation 340 can be generated by a computing device as described herein. In some examples, the graphical representation 340 can be similar to graphical representation 220 as referenced in FIG. 2. For example, the graphical representation 340 can include an x-axis 324 that can represent air temperature or other environmental conditions. The graphical representation 340 can also include a y-axis 322 that can represent a comfort level, a vote, and/or feedback from a user.

In some examples, the graphical representation 340 can be generated utilizing feedback and/or messages that includes comfort levels at a plurality of different temperatures or environmental conditions within an area. Graphical representation 340 illustrates a comfort model 330 for a first user with a first user ID. As described herein, a comfort model can be generated for each of a plurality of different users.

As described herein, a computing device can utilize the comfort model 330 for the first user to determine (e.g., calculate) a comfort condition 342 for the first user. In some examples, the comfort condition 342 can be an optimal environmental condition for the corresponding user based on the feedback from the user and/or comfort model 330. For example, the comfort condition 342 can correspond to a particular air temperature that the first user has identified as being comfortable via feedback as described herein.

In some examples, the graphical representation 340 can include a deviation 328 between a vote 326 and the comfort model 330. As described herein, the deviation 328 can be utilized to adjust the corresponding comfort model 330.

In some examples, the sensed temperature can be 20.5 degrees Celsius while an actual measured temperature of point 326 can be 23.5 degrees Celsius or a deviation is 3 degrees Celsius. The comfort condition of the user at point 342 can be 23.75 degrees Celsius. In this example, the zone environment conditions (e.g., temperature) for given user in a given area can be calculated to be set by 23.75 degrees Celsius+3 degrees Celsius deviation=26.75 degrees Celsius due to the determined anomaly in the zone.

In some examples, the comfort condition 342 of the first user can be compared to other comfort conditions of a plurality of other users to find a mutual comfort condition for the first user and plurality of other users. In some examples, the mutual comfort condition can be an average comfort condition for the plurality of users within an area. In some examples, the average comfort condition can be weighted by comfort sensitivity as described herein. The mutual comfort condition and/or the average comfort condition weighted by comfort sensitivity for the plurality of users within an area can be utilized to adjust an environmental condition within the area. In some examples, a computing device can adjust HVAC settings for the area based on the average comfort condition to provide an optimal environmental condition of the area for the current users within the area.

Figure 4:
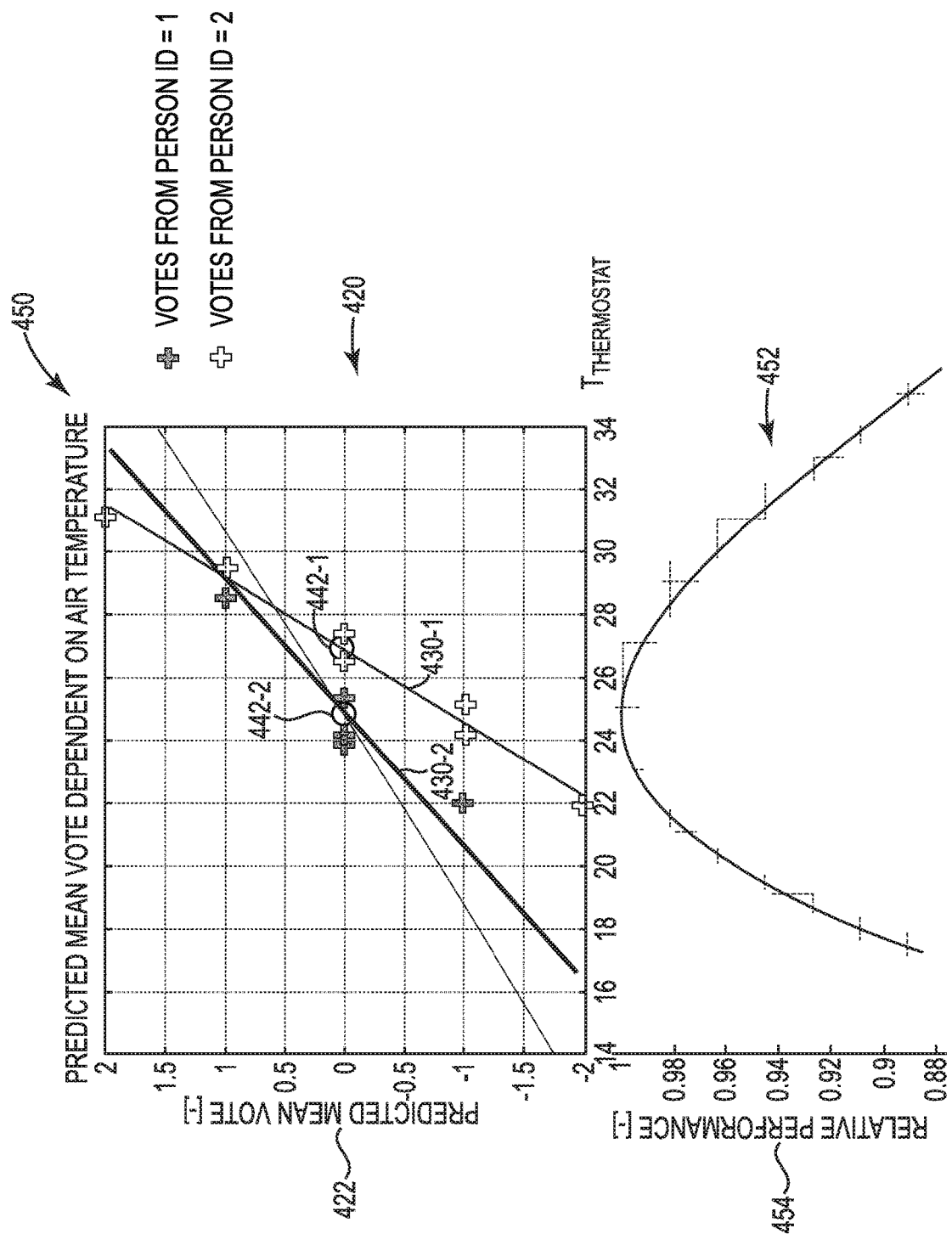
FIG. 4 is an example of a graphical representation of a performance degradation according to one or more embodiments of the present disclosure.

FIG. 4 is an example of a graphical representation 450 of a performance degradation according to one or more embodiments of the present disclosure. The graphical representation 450 can be generated by a computing device as described herein. In some examples, the graphical representation 450 can be similar to graphical representation 220 as referenced in FIG. 2 and/or graphical representation 340 as referenced in FIG. 3.

As described herein, a computing device can utilize the comfort model 430-1 for the first user and the comfort model 430-2 for the second user to determine (e.g., calculate) a comfort condition 442-1 for the first user and a comfort condition 442-2 for the second user respectively. In some examples, the comfort condition 442-1, 442-2 can be an optimal environmental condition for the corresponding user based on the feedback from the user and/or comfort model 430-1, 430-2. For example, the comfort condition 442-1 can correspond to a particular air temperature that the first user has identified as being comfortable via feedback as described herein.

The graphical representation 450 can include a comfort model portion 420 with an x-axis 424 that can represent air temperature or other environmental conditions. The comfort model portion 420 of the graphical representation 450 can also include a y-axis 422 that can represent a comfort level, a vote, and/or feedback from a user. The graphical representation can include a performance degradation portion 454 that can include the x-axis 424 and a y-axis 454 that can represent relative performance of a user.

In some examples, the graphical representation 450 can be generated utilizing feedback and/or messages that include comfort levels at a plurality of different temperatures or environmental conditions within an area. Graphical representation 450 illustrates a comfort model 430-1 for a first user with a first user ID and a comfort model 430-2 for a second user with a second user ID. As described herein, a comfort model can be generated for each of a plurality of different users.

In some examples, the graphical representation 450 can include a performance degradation portion 452. In some examples, the performance degradation portion 452 can utilize the same x-axis 424 as the comfort model portion 420. In some examples, the performance degradation portion 452 can include a y-axis 454 of relative performance. In some examples, the comfort model portion 420 and performance degradation portion 452 can be combined to determine how environmental conditions and/or discomfort can reduce performance of particular users.

In some examples, a cost can be determined (e.g., calculated) for each area and/or for each of the plurality of users within an area based on the combined comfort model portion 420 and performance degradation portion 452. In some examples, a cost can be calculated for the plurality of users within an area based on: a predicted performance degradation of the plurality of users, a cost of adjusting environmental settings such as HVAC settings, a predicted quantity of time the plurality of users are within the area, among other factors described herein. In some examples, calculating the cost can include calculating a cost of maintaining the environmental setting for the area based on the human performance degradation function.

In some examples, a computing device can calculate a comfort cost for each of the plurality of users based on the comfort model for each of the plurality of users. In some examples, the comfort cost can be a cost associated with a decrease in relative performance of the user over a period of time. In some examples, the comfort cost can be combined with the cost associated with adjusting the environmental settings. In some examples, the computing device can generate a cost savings for adjusting the environmental setting for the area based on the performance degradation function as described herein.

For example, a computing device can determine a quantity of time the plurality of users are going to be within the area. In this example, calendar information can be utilized to determine how long the plurality of users are expected to utilize the area. In this example, the computing device can utilize the comfort model, discomfort function, and/or performance degradation to calculate a cost of lost productivity at current environmental conditions within the area for each of the plurality of users. In this example, the computing device can also calculate a cost of adjusting the environmental settings and/or HVAC settings for the area during the expected quantity of time the users will be within the area. In some examples, the calculated cost can be utilized to determine if or when the environmental settings are adjusted.

By calculating cost that includes financial cost of adjusting an HVAC unit or other environmental settings of an area with productivity costs associated with users within the area, a computing device can weigh the costs and either adjust environmental settings of the area or determine that settings should remain due to cost. Calculating the cost associated with an area can save financial costs associated with environment control while weighing the potential performance degradation cost due to uncomfortable users within the area.

Figure 5:
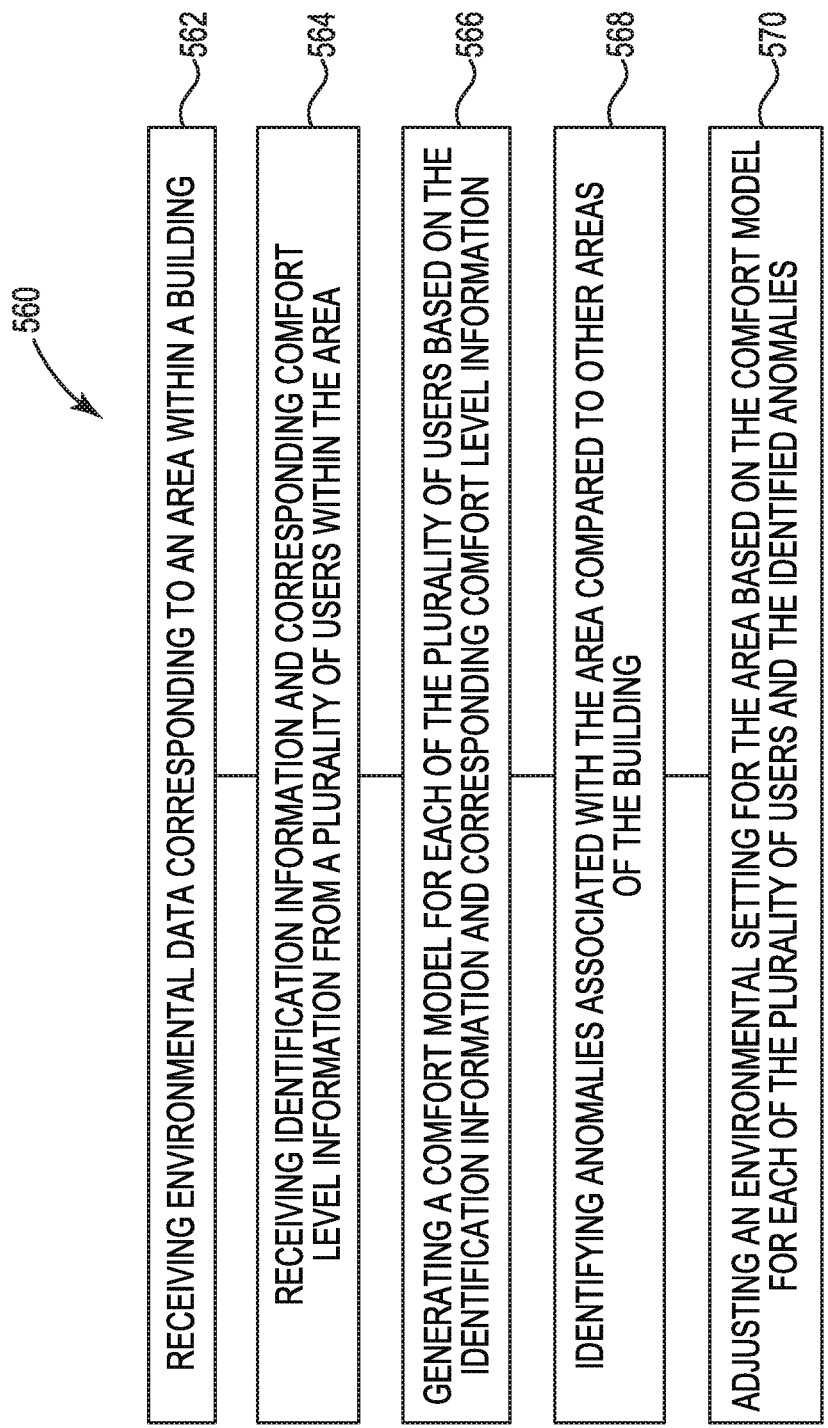
FIG. 5 is an example of a method for building comfort control according to one or more embodiments of the present disclosure.

FIG. 5 is an example of a method 560 for building comfort control according to one or more embodiments of the present disclosure. In some examples, the method 560 can be performed by a computing device such as computing device 102 as previously describe herein. In some examples, the computing device executing the method 560 can be coupled to an HVAC unit or other environmental control unit. In some examples, the computing device executing the method 560 can be coupled to a network to receive feedback and/or notify users associated with an area.

At block 562 the method 560 can include receiving environmental data corresponding to an area within a building. The environmental data corresponding to the area can include air temperature data, air movement data, air moisture data, natural light data, non-natural light data, among other data relating to the environment within the area of the building. In some examples, a plurality of sensors can be coupled to a computing device as described herein. For example, the plurality of sensors can include temperature sensors, humidity sensors, among other types of sensors to collect data relating to the environment within the area of the building.

At block 564 the method 560 can include receiving identification information and corresponding comfort level information from a plurality of users within the area. In some examples, the identification information can include a user ID associated with feedback. For example, the plurality of users can log into an application of a mobile device and provide feedback to a computing device as described herein. In this example, each of the plurality of users can have a corresponding user ID that allows the computing device to identify the user.

In some examples, a user can be identified by a corresponding user ID. In some examples, the identification information can be security ID information. For example, a user can provide security information when entering the area. In this example, the computing device can receive the security information to determine the users within the area. In some examples, the computing device can identify the user and utilize a corresponding comfort model, discomfort function, and/or human performance degradation function for the plurality of users identified within the area.

At block 566 the method 560 can include generating a comfort model for each of the plurality of users based on the identification information and corresponding comfort level information. In some examples, generating the comfort model includes generating a discomfort function and/or human performance degradation function based on a productivity information for the plurality of users.

In some examples, generating the comfort model can include retrieving a comfort model for each of a plurality of current occupants within the area. For example, the comfort models for each of a plurality of users can be generated by the computing device. In this example, the computing device can store the comfort models in a database to be retrieved and utilized when occupants are identified within the area.

At block 568 the method 560 can include identifying anomalies associated with the area compared to other areas of the building. As described herein, anomalies of the area can be determined based on feedback provided by the plurality of users. For example, a user may be comfortable at 25 degrees Celsius based on feedback provided by the user. In this example, the user may provide feedback that they are not comfortable at 25 degrees Celsius in a particular area when the user has provided feedback that they are comfortable at 25 degrees Celsius in other areas. In this example, a notification can be sent to further inspect the particular area with a notification that the particular area should be inspected for anomalies.

In some examples, identifying anomalies associated with the area includes comparing real time messages from the plurality of users to historic messages from the plurality of users. In some examples, identifying anomalies for the area includes determining when a real time message is outside a threshold value calculated by the historic messages.

In some examples, the anomalies can be specific to the identified area. For example, a thermostat may be non-functional in the particular area and the actual temperature of the particular area is not the same as the temperature determined by the thermostat. In some examples, the anomalies may not be directly associated with to the air temperature of the area. For example, the air temperature of the particular area may be 25 degrees Celsius, but the quantity of natural light, paint color of the particular area, artwork within the particular area, and/or other features may make the user have an perception of being uncomfortable.

At box 570 the method 560 can include adjusting an environmental setting for the area based on the comfort model for each of the plurality of users, and the identified anomalies. As described herein, adjusting the environmental setting for the area can include adjusting a setting of an HVAC unit. In some examples, adjusting the environmental setting can include adjusting other features of the area such as physical features of the area. For example, the physical features of the area can include paint color, artwork within the area, quantity of natural light, type of non-natural light, among other features of an area.

As described herein, a "module" can include computer readable instructions that can be executed by a processing resource to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processing resource.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above elements and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device for building comfort control operably coupled with a network that provides the computing device with comfort level feedback from each of a plurality of users, the computing device comprising:
    a memory; and
    a processor configured to execute instructions to:
        receive feedback from a plurality of users on a comfort level for an area of a building via the network;
        generate a comfort model including a sensitivity level for each of the plurality of users based on the feedback, where the sensitivity level for a particular user is determined from the particular user's feedback, wherein the particular user's feedback includes a message received from the particular user via the network, wherein the message includes a description of their comfort level in response to a known change of an environmental condition, a location of the particular user when the particular user provided the feedback, and a timestamp indicating when the feedback was provided by the particular user, and wherein the sensitivity level of a particular user corresponds to a rate of change of the particular user's comfort feedback based on changes in the environmental conditions; and
        adjust a number of settings of a heating, ventilation, and air conditioning (HVAC) unit for the area based on the comfort model including a weighted value based on the sensitivity level for those users among the plurality of users who are currently in the area.

2. The computing device of claim 1, wherein the computing device is configured to determine a weighted average of the comfort models for the plurality of users currently within the area of the building.

3. The computing device of claim 1, wherein the processor is configured to rate the plurality of users based on the comfort model for each of the plurality of users.

4. The computing device of claim 1, wherein the processor is configured to generate a discomfort function for each of the plurality of users based on the comfort model for each of the plurality of users.

5. The computing device of claim 1, wherein the processor is configured to:
    determine a maximum value and a minimum value of the number of settings; and
    alter the settings of the HVAC unit based on the determined maximum value and the determined minimum value of the number of settings.

6. A non-transitory computer readable medium, comprising instructions executable by a processing resource that is operably coupled with a network that provides the processing resource with comfort level feedback from each of a plurality of users, the instructions when executed by the processing resource causing the processing resource to:
    receive messages via the network from each of a plurality of users that include a description of a comfort level along a range of comfort levels for an area of a building, a location of the user when the user provided the feedback, and a timestamp indicating when the feedback was provided by the user, and wherein the sensitivity level of a particular user corresponds to a rate of change of the particular user's comfort feedback along the range of comfort levels based on changes in the environmental conditions;
    generate a comfort model including a sensitivity level for each of the plurality of users based on the messages, wherein the comfort model for each of the plurality of users includes a comfort level for that respective user compared to a temperature of the area, and the sensitivity level for that respective user is determined from the messages received from the respective user in response to changes in an environmental condition; and
    adjust an environmental setting for the area based on the comfort model including a weighted value based on the sensitivity level for those users among the plurality of users who are currently in the area.

7. The medium of claim 6, wherein the messages from each of the plurality of users include a value from a comfort level scale that represents a comfort level of a user within the area.

8. The medium of claim 6, wherein the processing resource is configured to generate a discomfort function for each of the plurality of users based on the comfort model for each of the plurality of users.

9. The medium of claim 8, wherein the processing resource is configured to generate a performance degradation function for each of the plurality of users based on the comfort model for each of the plurality of users.

10. The medium of claim 9, wherein the processing resource is configured to calculate a cost of maintaining the environmental setting for the area based on the performance degradation function.

11. The medium of claim 6, wherein the environmental setting is:
    a temperature setting;
    a airflow setting;

a heating, ventilation, and air conditioning (HVAC) unit setting; or a lighting setting.

12. The medium of claim 6, wherein the processing resource is configured to determine the users among of the plurality of users who are currently in the area.

13. The medium of claim 12, wherein the processing resource is configured to:

determine users among the plurality of users who will be in the area at a particular time; and adjust the environmental setting based on the comfort model for the users who will be in the area at the particular time.

14. A method for building comfort control, comprising:

receiving environmental data corresponding to an area within a building;

receiving identification information and corresponding comfort level information from a plurality of users within the area;

generating a comfort model including a sensitivity level for each of the plurality of users based on the identification information and corresponding comfort level information, where the sensitivity level for each of the plurality of users is determined from the comfort level information received from each of the respective users in response to a change of an environmental condition, wherein the sensitivity level of a particular user corresponds to a rate of change of the particular user's comfort feedback based on changes in the environmental conditions;

identifying anomalies associated with the area compared to other areas of the building; and adjusting an environmental setting for the area based on the comfort model, a weighted value based on the sensitivity level, a discomfort function for each of the plurality of users, and the identified anomalies.

15. The method of claim 14, comprising generating the discomfort function for each of the plurality of users and generating a performance degradation function based on the productivity information for each of the plurality of users.

16. The method of claim 15, comprising generating a cost savings for adjusting the environmental setting for the area based on the performance degradation function for each of the plurality of users.

17. The method of claim 14, wherein the identified anomalies of the area include one or more of:

a thermostat failure within the area;

a heating, ventilation, and air conditioning (HVAC) unit failure within the area;

a lighting failure within the area;

a paint color of the area; and a design of the area.

18. The method of claim 14, wherein identifying anomalies for the area includes comparing real time messages from the plurality of users to historic messages from the plurality of users.

19. The method of claim 18, wherein identifying anomalies for the area includes determining when a real time message from the real time messages is outside a threshold value based on the comfort model.

* * * * *